US007193830B2

(12) United States Patent
Fournier et al.

(10) Patent No.: US 7,193,830 B2
(45) Date of Patent: Mar. 20, 2007

(54) SURGE SUPPRESSOR

(75) Inventors: Greg Fournier, West Kingston, RI (US); Mark H. Germagian, Hudson, MA (US); Ronnie L. Bell, Nashua, NH (US)

(73) Assignee: American Power Conversion Corporation, West Kingston, RI (US)

( * ) Notice: Subject to any disclaimer, the term of this patent is extended or adjusted under 35 U.S.C. 154(b) by 0 days.

(21) Appl. No.: 10/411,493

(22) Filed: Apr. 10, 2003

(65) Prior Publication Data

US 2004/0201940 A1 Oct. 14, 2004

(51) Int. Cl.
*H02H 3/00* (2006.01)

(52) U.S. Cl. .................................................. 361/111

(58) Field of Classification Search ................ 361/127, 361/111, 56

See application file for complete search history.

(56) References Cited

U.S. PATENT DOCUMENTS

| | | | | | |
|---|---|---|---|---|---|
| D284,758 | S | * | 7/1986 | Maloney | D13/137.3 |
| 4,930,047 | A | * | 5/1990 | Peterson | 361/736 |
| D319,213 | S | * | 8/1991 | Wiand | D13/139.8 |
| 5,071,367 | A | * | 12/1991 | Luu | 439/501 |
| D342,055 | S | | 12/1993 | Wakefield | |
| D350,940 | S | | 9/1994 | Rossman et al. | |
| D363,059 | S | | 10/1995 | Deloughry | |
| 5,488,534 | A | * | 1/1996 | Rau et al. | 361/56 |
| D368,893 | S | * | 4/1996 | Harwood et al. | D13/139.8 |
| 5,519,561 | A | * | 5/1996 | Mrenna et al. | 361/105 |
| 5,708,554 | A | * | 1/1998 | Liner | 361/104 |
| 5,780,775 | A | * | 7/1998 | Yu | 174/135 |
| 5,902,140 | A | * | 5/1999 | Cheung et al. | 439/139 |
| D411,168 | S | * | 6/1999 | Rossman et al. | D13/139.6 |
| D411,981 | S | | 7/1999 | Jeon-Chapman et al. | |
| D416,234 | S | | 11/1999 | Veino et al. | |
| 6,042,426 | A | * | 3/2000 | Byrne | 439/654 |
| 6,113,434 | A | * | 9/2000 | Pate | 439/652 |
| D433,386 | S | | 11/2000 | Veino et al. | |
| D435,516 | S | * | 12/2000 | Stekelenburg | D13/139.8 |
| 6,179,665 | B1 | * | 1/2001 | Rossman et al. | 439/654 |
| D439,562 | S | | 3/2001 | Veino et al. | |
| D445,403 | S | | 7/2001 | Veino et al. | |

(Continued)

OTHER PUBLICATIONS

International Search Report for PCT/US04/10926, mailed Jun. 22, 2005.

*Primary Examiner*—Brian Sircus
*Assistant Examiner*—Boris Benenson
(74) *Attorney, Agent, or Firm*—Mintz, Levin, Cohn, Ferris, Glovsky and Popeo, P.C.

(57) ABSTRACT

The invention relates to surge suppressors. One embodiment provides a surge suppressing device including: a power circuit having an MOV and a thermal fuse in proximity to the MOV; an isolation structure containing the MOV and the thermal fuse; and a plurality of utility outlets in electrical communication with the power circuit. The isolation structure isolates the MOV and thermal fuse from at least a portion of the surge-suppressing device and encapsulates emissions from the MOV during an overvoltage event. Another embodiment provides a surge suppressing device including: a power section having a power circuit; an intermediate section adjacent to the power section; and an outlet section adjacent to the intermediate section such that the intermediate section separates the power section and the outlet section. The outlet section includes a plurality of utility outlets in electrical communication with the power circuit. Further embodiments are described.

14 Claims, 15 Drawing Sheets

U.S. PATENT DOCUMENTS

| | | | | |
|---|---|---|---|---|
| 6,282,075 | B1 * | 8/2001 | Chaudhry | 361/111 |
| D455,091 | S * | 4/2002 | Mimoto | D13/139.8 |
| D458,225 | S * | 6/2002 | Stekelenburg | D13/139.8 |
| 6,443,772 | B1 * | 9/2002 | Chen | 439/652 |
| D467,875 | S | 12/2002 | Barger et al. | |
| D468,366 | S | 1/2003 | Blake, Jr. | |
| 6,816,352 | B2 * | 11/2004 | Hoopes | 361/104 |
| 6,971,920 | B2 * | 12/2005 | Crupi | 439/654 |

* cited by examiner

SURGE SUPPRESSOR

BACKGROUND OF THE INVENTION

The present invention relates to surge suppressors and, more specifically, to a surge suppressor having utility outlets and/or a power cord.

Conventional personal surge suppressors, that is non-industrial surge protectors having utility outlets and a power cord, often include a metal oxide varistor (MOV) as part of a surge suppressing circuit. When an MOV fails, it can expel emissions, e.g., debris, that can result in a cascade of other events/failures. One attempt to prevent such a catastrophic failure of the MOV involves taping the MOV to a thermal fuse that is part of the surge suppressing circuit. Taping the MOV(s) to a thermal fuse is not an ideal solution because heat may be generated on the opposite side of the MOV from the thermal fuse and thus the MOV can still fail. Furthermore, taping the MOV to the thermal fuse is labor intensive.

In addition, when a MOV fails it can disperse carbon onto the board to which it is attached. This phenomenon is termed carbon tracking. The dispersed carbon can cause a conductive short between elements on the board. In other words, the carbon can cause inadvertent conduction of electricity between board elements potentially resulting in malfunction of the board.

Thus, a need exists for a surge protector that is relatively inexpensive, easy to use, easy to manufacture, that reduces the likelihood of catastrophic MOV failure, and that reduces the impact in the event of a catastrophic failure.

SUMMARY OF THE INVENTION

The present invention relates to surge suppressors. One embodiment of the invention provides a surge suppressing device including: a power circuit having a metal oxide varistor (MOV) and a thermal fuse in proximity to the MOV; an isolation structure containing the MOV and the thermal fuse; and a plurality of utility outlets in electrical communication with the power circuit. The isolation structure isolates the MOV and thermal fuse from at least a portion of the surge-suppressing device and encapsulates emissions from the MOV during an overvoltage event.

Another embodiment of the invention provides a surge suppressing device including: a power section having a power circuit; an intermediate section adjacent to the power section; and an outlet section adjacent to the intermediate section such that the intermediate section separates the power section and the outlet section. The outlet section includes a plurality of utility outlets in electrical communication with the power circuit.

Thus, embodiments of the invention advantageously keep the MOV/power section separate from the utility outlets/outlet section. In the event there is a catastrophic event in the power circuit, e.g., in the MOV, maintaining such separation reduces the flow of resulting smoke and debris into the outlet section. Similarly, maintaining such separation reduces the flow of oxygen from the outlet section to the source of the heat, smoke, and/or debris, which in turn reduces the extent of the catastrophic event. Advantageously, embodiments of the invention also provide a user with an intuitive visual presentation of the elements of the surge suppressor and how to use the surge suppressor. For example, placing the surge suppressor on a table, the device can have a face with a power section having a master switch on the top of the face, a data section in the middle of the face and an outlet section on the bottom of the face.

Yet another embodiment provides a surge suppressing device including: a housing having a first face, the housing defining: a power section including a power circuit; and an outlet section including a plurality of utility outlets arranged in three rows on the first face of the housing. The device has a longitudinal axis and the three rows run substantially parallel to the longitudinal axis. The three rows include a center row and two peripheral rows. The center row includes at least first and second center outlets. The first and second center outlets are arranged in top-to-bottom order. The peripheral rows include first and second peripheral outlets. The first and second peripheral outlets are arranged in side-to-side order.

BRIEF DESCRIPTION OF THE ILLUSTRATED EMBODIMENTS

DETAILED DESCRIPTION OF THE INVENTION

Figure 1:
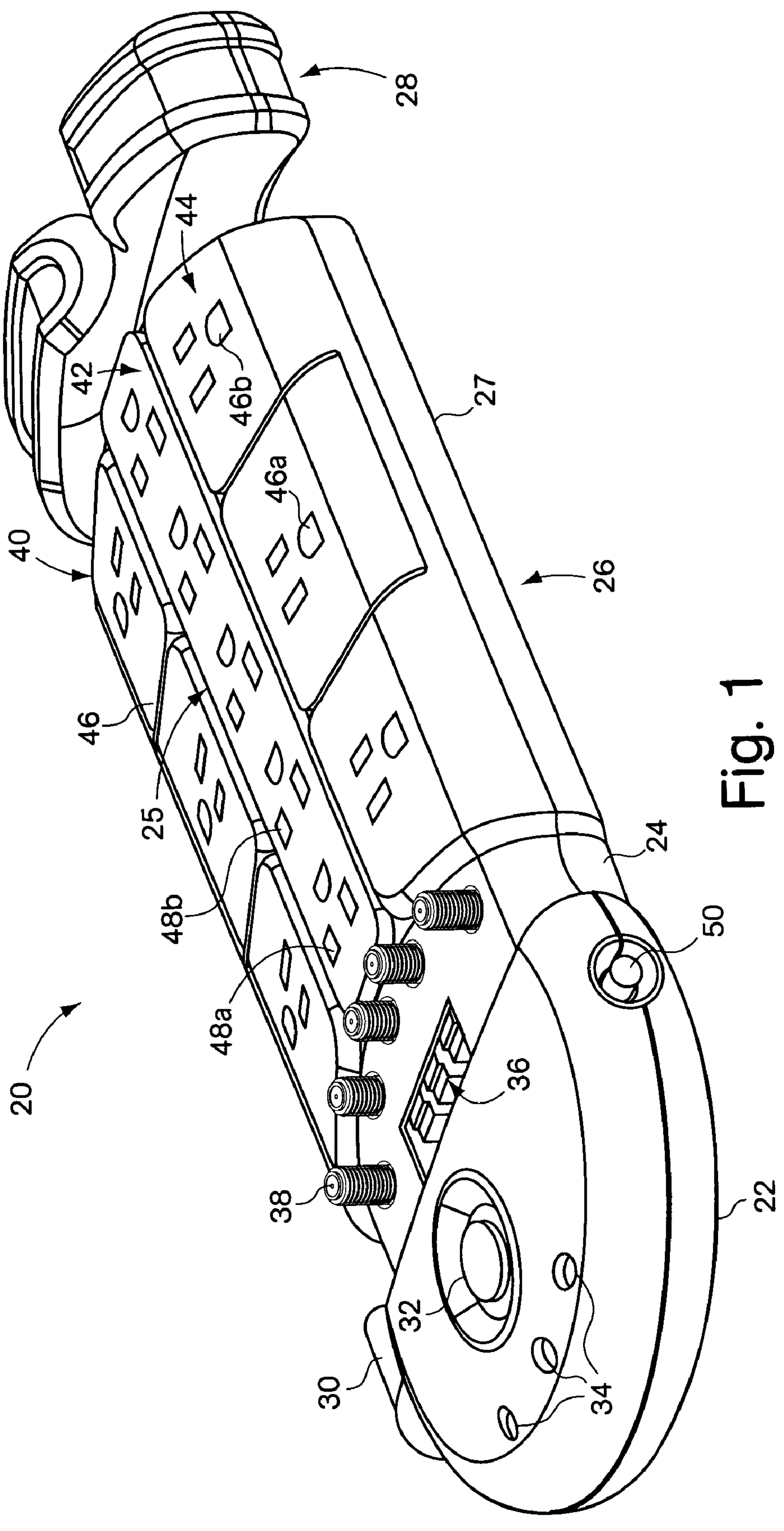
FIG. 1 is a perspective view of one embodiment of a surge suppressor according to one embodiment of the invention.

The present invention relates to surge suppressors. With reference to FIG. 1, one embodiment of a surge suppressor 20 according to the invention has a power section 22, an intermediate section 24, e.g., a data section, adjacent to the power section, and an outlet section 26 adjacent to the intermediate section. The surge suppressor 20 has a housing 27 with a face 25 and can further include a cord manager 28 removeably and replaceably coupled to the housing. In one embodiment, a user can adjust the degree of extension of the cord manager 28 from the housing 27.

The power section 22 has a power cord 30, a master switch 32, overload detection signals 34 and a circuit breaker reset button 50. In one embodiment the intermediate section is a data section and includes inputs for a network and/or a telephone line 36 and cable connectors 38. The outlet section includes three rows of outlets, a center row 42 and two peripheral rows 40, 44. The two peripheral rows 40, 44 can include transformer outlets adapted to receive transformer plugs. Thus, the width of the transformer outlets should be at least twice the width of the standard outlets for the country for which the surge suppressor is intended. For example, in the United States a standard outlet is 1.125 inches wide and a transformer outlet should be at least 2.25 inches wide. In addition, if the first face 25 of the housing 27 lies substantially in a plane, then the peripheral outlets 46 can be inclined downward out of the plane to facilitate access to the plugs and/or outlets of the center row 42. The angle of inclination can be from about 5 degrees to about 45 degrees. In one embodiment, the angle of inclination is about 10 degrees.

For present purposes, one can describe an outlet as having an outlet face with a top border, a bottom border, a first side border and a second side border. Also for present purposes, one can describe a first outlet and a second outlet as being arranged in top-to-bottom order when the bottom border of the first outlet face 48*a* is adjacent to the top border of the second outlet face 48*b*. Similarly, one can describe a first outlet and a second outlet as being arranged in side-to-side order when the first side of the first outlet face 46*a* is adjacent to the second side of the second outlet face 46*b*. Given the above, in one embodiment the outlets in the center row are arranged in top-to-bottom order and the outlets in the peripheral rows are arranged in side-to-side order.

Figure 2:
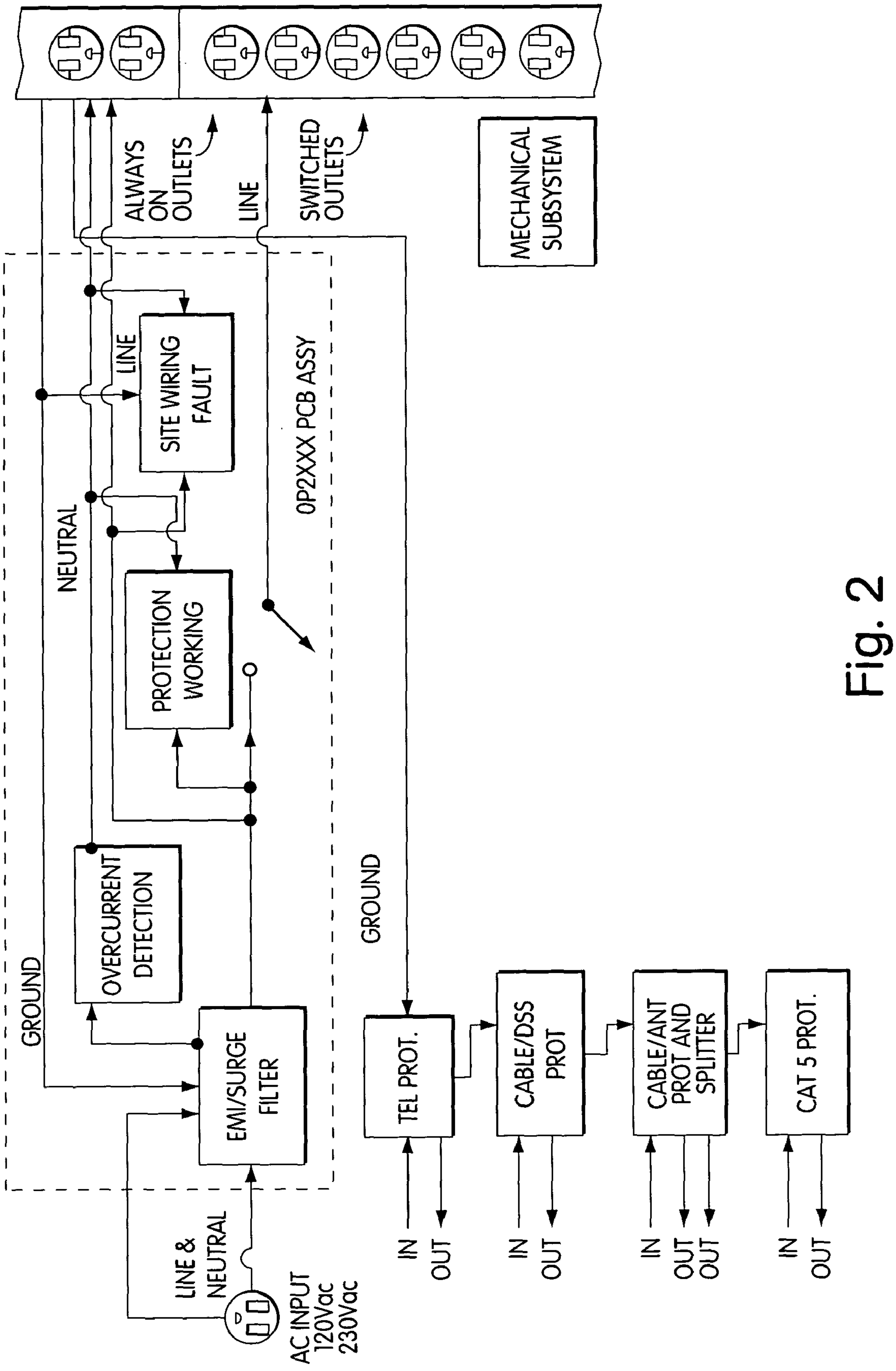
FIG. 2 is a high-level block diagram of the components of the surge suppressor of FIG. 1.

With reference to FIG. 2, the components of the surge suppressor of FIG. 1 include an alternating current (ac) input, e.g., a power cord, providing alternating current to an electromagnetic interference (EMI)/surge filter located on a printed circuit board (PCB). The filter in turn has electrical connections to an overcurrent detection circuit, and to line and ground. The overcurrent detection circuit has an electrical connection to neutral. The protection working circuit and the site wiring fault circuit have electrical connections to line, neutral, and ground. The outlets have electrical connections to neutral and ground. The always-on outlets have electrical connections to line and the switched outlets have switched electrical connections to line. In addition, the surge suppressor can include a telephone protection circuit, a cable/digital subscriber service (DSS) protection circuit, a cable/antennae protection circuit, and/or a network interface, e.g., a category 5 cable standard interface, protection circuit, each of which has an electrical connection to ground.

Figure 14:
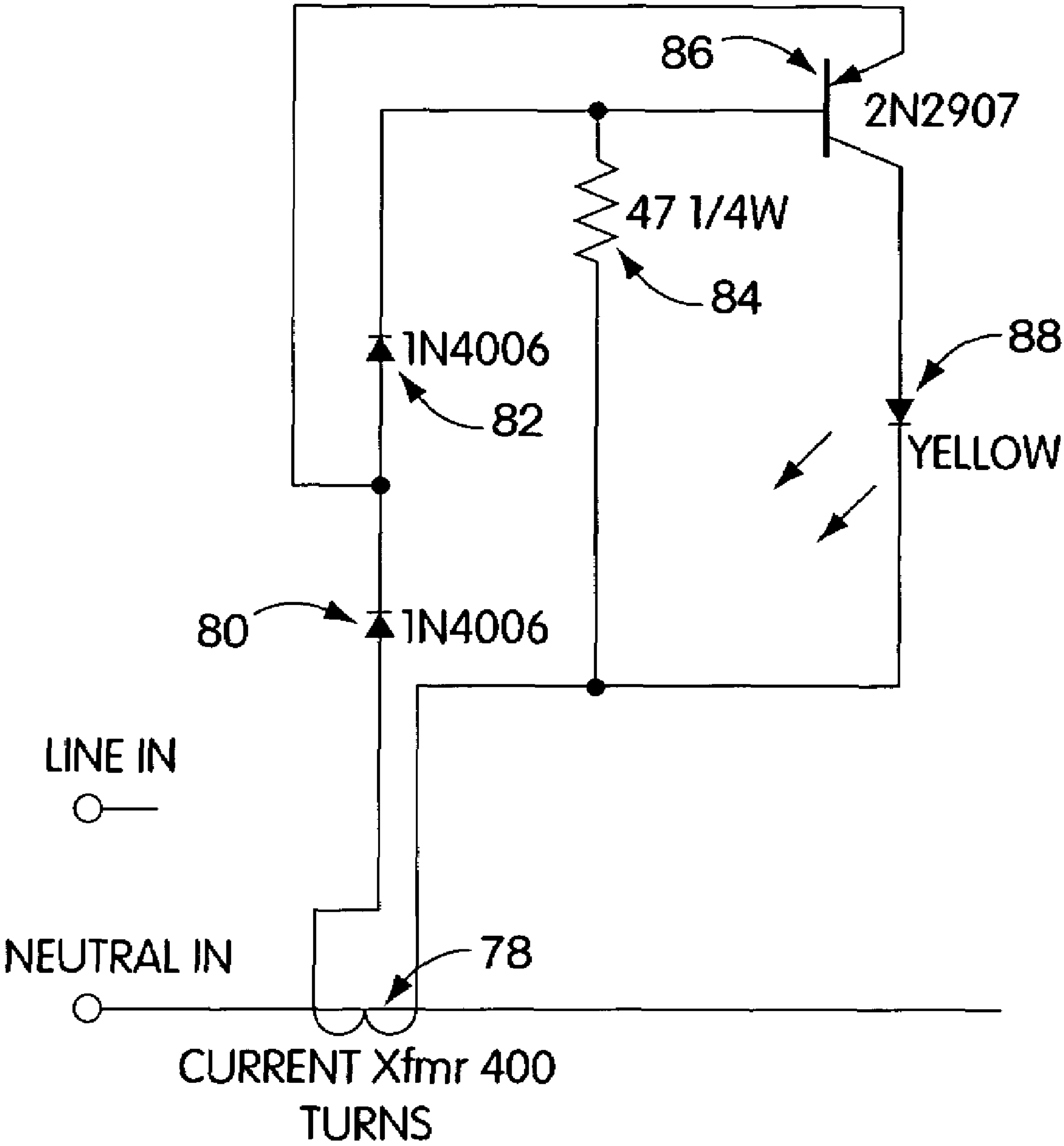
FIG. 14 is a schematic of the overload detection/warning circuit.

With reference to FIG. 14, one embodiment of the overload detection circuit includes a 400 to 1 turns ratio transformer 78 that couples to the neutral line. A first lead of the transformer couples through a diode 80 to the emitter of a pnp bipolar transistor 86. The emitter is coupled through another diode 82 to the base of the transistor 86. A resistor couples the base of the transistor to the second lead of the transformer 787. A light emitting diode (LED) 88 couples the collector of the transistor 86 to the second lead of the transformer 78. By selecting an appropriately sized resistor, one can select the base current at which the transistor is switched on. As an example, one can select the components of the detection circuit such that the LED will start emitting at 12 amps and will be fully illuminated at 15 amps at which point it is only a matter of time before the circuit breaker trips. Thus, the overload detection circuit provides a warning that one is approaching the point at which the circuit breaker will trip.

Figure 3A:
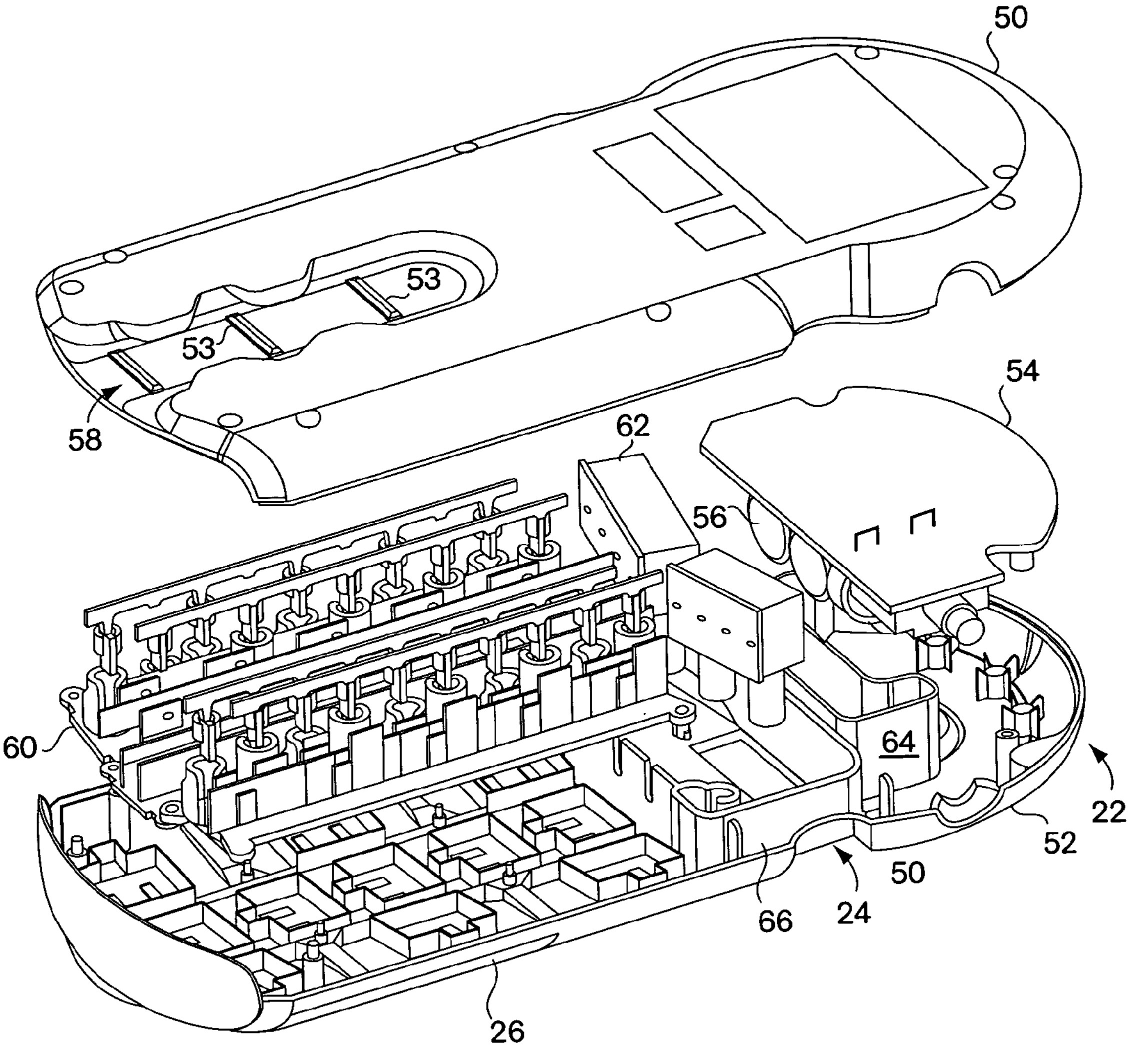
FIG. 3A is an exploded bottom perspective view of the surge suppressor of FIG. 1.

With reference to FIG. 3A, the surge suppressor of FIG. 1 includes first and second opposing housing portions 52, 50. In one embodiment the first portion 52 is the top half of the housing and the second portion 50 is the bottom half of the housing. The surge suppressor can further include outlet assemblies 60 arranged in top-to-bottom order and in side-to-side order, power PCB 54 including a metal oxide varistors (MOVs) 56 and at least one thermal fuse in proximity to the MOVs, data protection circuits 62, an intermediate section defining structure 66, and an isolation structure 64 for containing the MOV and thermal fuse.

As can be seen in the exploded view of FIG. 3A, in one embodiment, the isolation structure 64 is a wall that is integral with first housing portion 52. The wall seals against the PCB to encapsulate the MOVs 56 with the at least one thermal fuse. The wall can be about 0.035 to about 0.045 inches thick so that, in the event of an overvoltage event causing the MOV to heat, the walls collapse inward reducing the likelihood of emission of fire and/or smoke. In other words, the isolation structure keeps smoke and debris that may be expelled form the MOV during a catastrophic event from contaminating the rest of the product. For example, the isolation structure can prevent carbon tracking across the PCB, which can cause a conductive short also known as a resistive short. More specifically, when an MOV in a surge suppressor fails it can disperse carbon over the board to which it is attached possibly resulting in undesired electrical conduction between board elements via the dispersed carbon.

Figure 13:
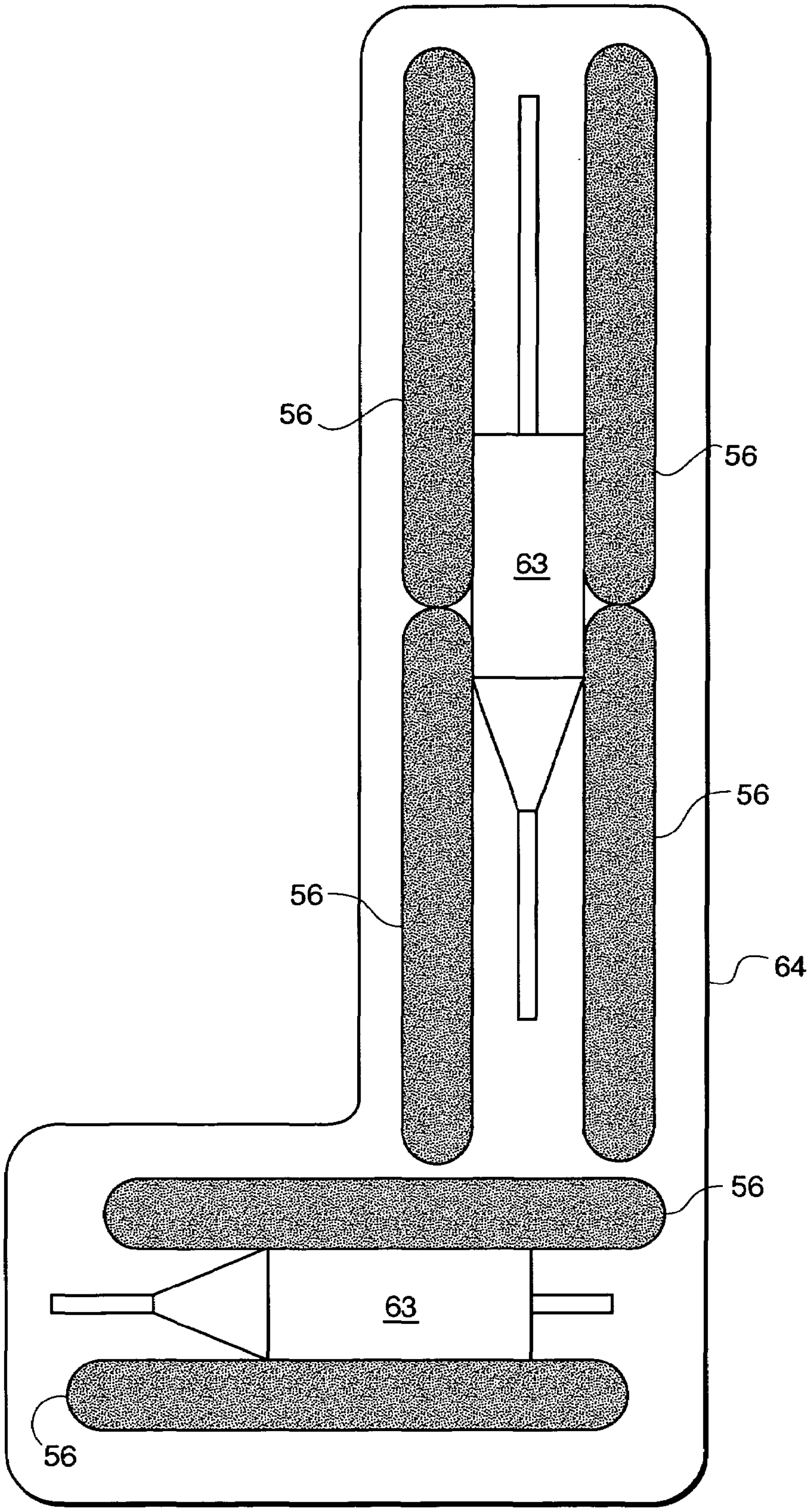
FIG. 13 illustrates one embodiment of the MOVs, thermal fuses and isolation structure of the surge suppressor of FIG. 1.

In addition, the isolation structure facilitates heat transfer from the MOV to the thermal fuse to ensure that the thermal fuse clears prior to severe thermal runaway that could excessively damage the MOV. More specifically, and with reference to FIGS. 1, 3A and 13, the isolation structure 64 entraps heat produced by MOV(s) 56 within the relatively small volume defined by the isolation structure and first and second housing portions. In this way, the isolation structure facilitates heat transfer from the MOV(s) to the thermal fuse(s) 63 located in proximity to the MOV(s), e.g., sandwiched between two or more MOVs.

As can also be seen in FIG. 3A, in one embodiment the intermediate section defining structure 66 is a wall that is integral with the first housing portion 52. The wall 66 provides further protection of the rest of the product from smoke, heat, and debris that may occur during a catastrophic event. The wall 66 also ensures that debris and smoke from catastrophic events in the data section 24 do not contaminate the outlet section 26.

Figure 3B:
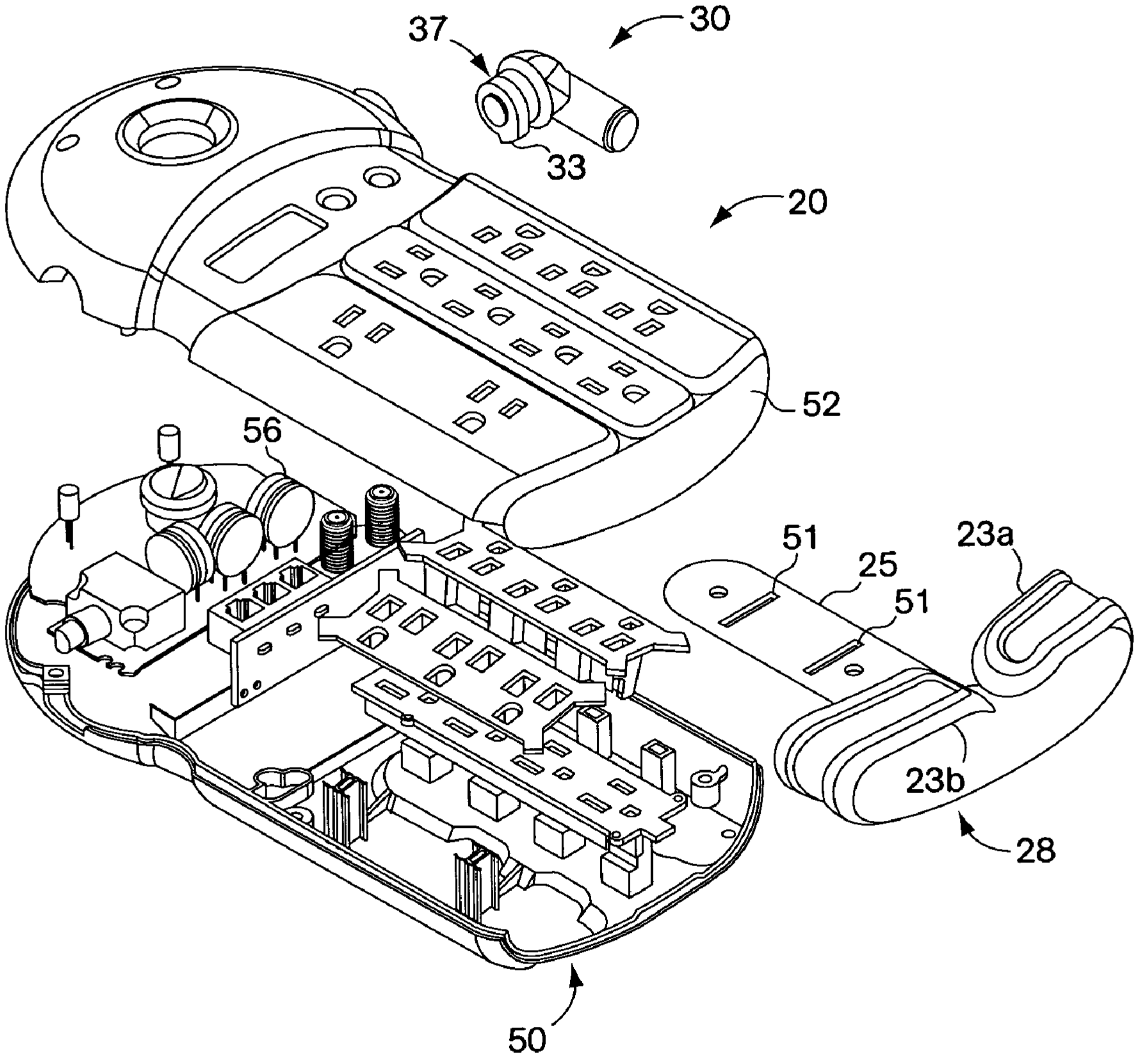
FIG. 3B is an exploded top perspective view of an alternative embodiment of a surge suppressor according to the present invention.
Figure 7:
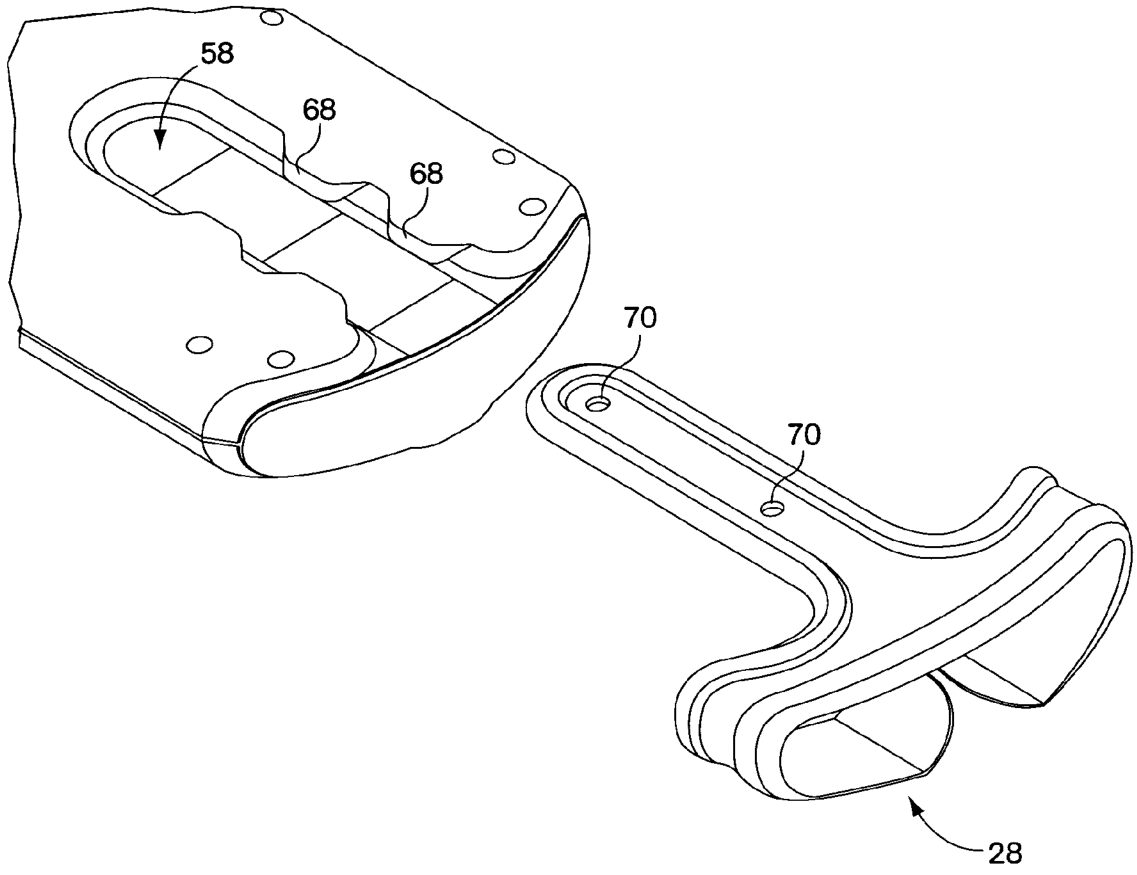
FIG. 7 is a perspective view of the bottom of the surge suppressor of FIG. 6 with the cord manager pulled out of and away from the surge suppressor housing.

With reference to FIGS. 1, 3A, 6 and 7, the second housing portion 50 can also include a cord manager engagement slot 58 for slidably and adjustably engaging the cord manager 28. More specifically, in one embodiment the engagement slot 58 can include retaining ridges 68 adapted to engage the cord manager and to facilitate the sliding, user-adjustable extension of the cord manager away from the housing 27. Furthermore, as shown in FIG. 7, one can completely remove the cord manager 28 from the housing 27 and mount the cord manager 28 to an external location using mounting holes 70. As shown in FIG. 3B, in one embodiment the cord manager includes a spine 25 (adapted for entering the engagement slot 58) and two arms 23*a*, 23*b* curled in toward each other so that the distal ends of the arms, i.e., the hands, are nearly touching. This configuration allows the cord manager to adjustably extend from the surge suppressor housing and to receive a plurality of power cords, cables, and/or data lines that one can plug into the surge suppressor. With reference to FIGS. 3A and 3B, the spine 25 and/or the engagement slot 58 can include detents 51, 53 that allows the cord manager to set into extension position(s) such that detents resist arbitrary movement/extension of the cord manager.

Figure 8:
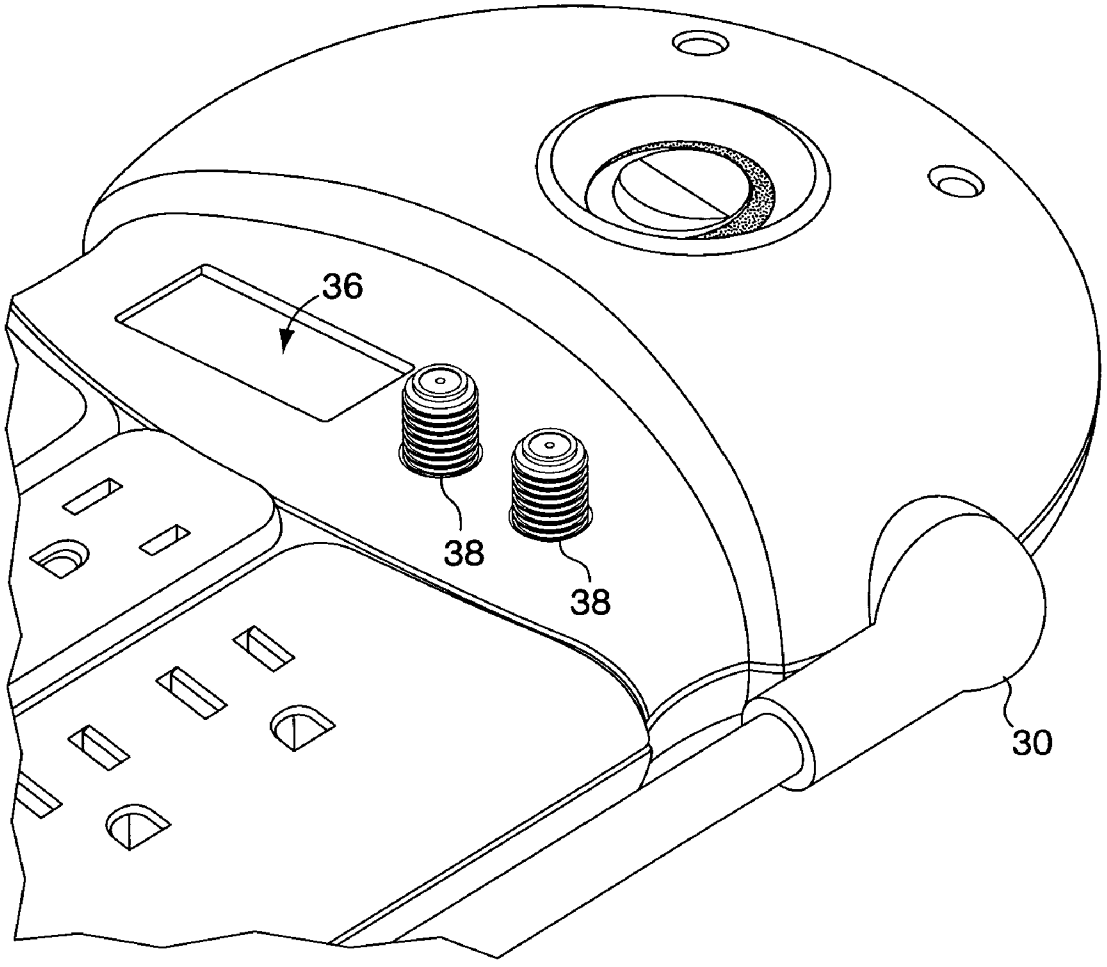
FIG. 8 is a perspective view of the top of the surge suppressor of FIG. 1 with the power cord in a first position.
Figure 9:
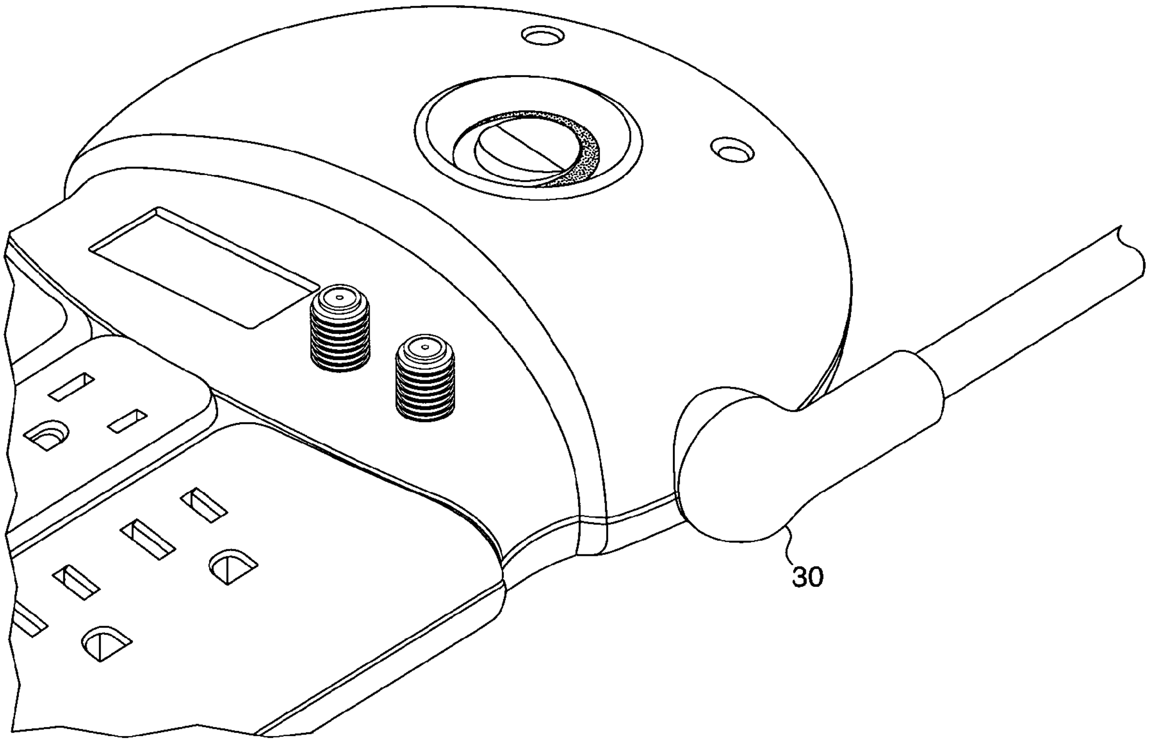
FIG. 9 is a perspective view of the top of the surge suppressor of FIG. 1 with the power cord in a second position.
Figure 10:
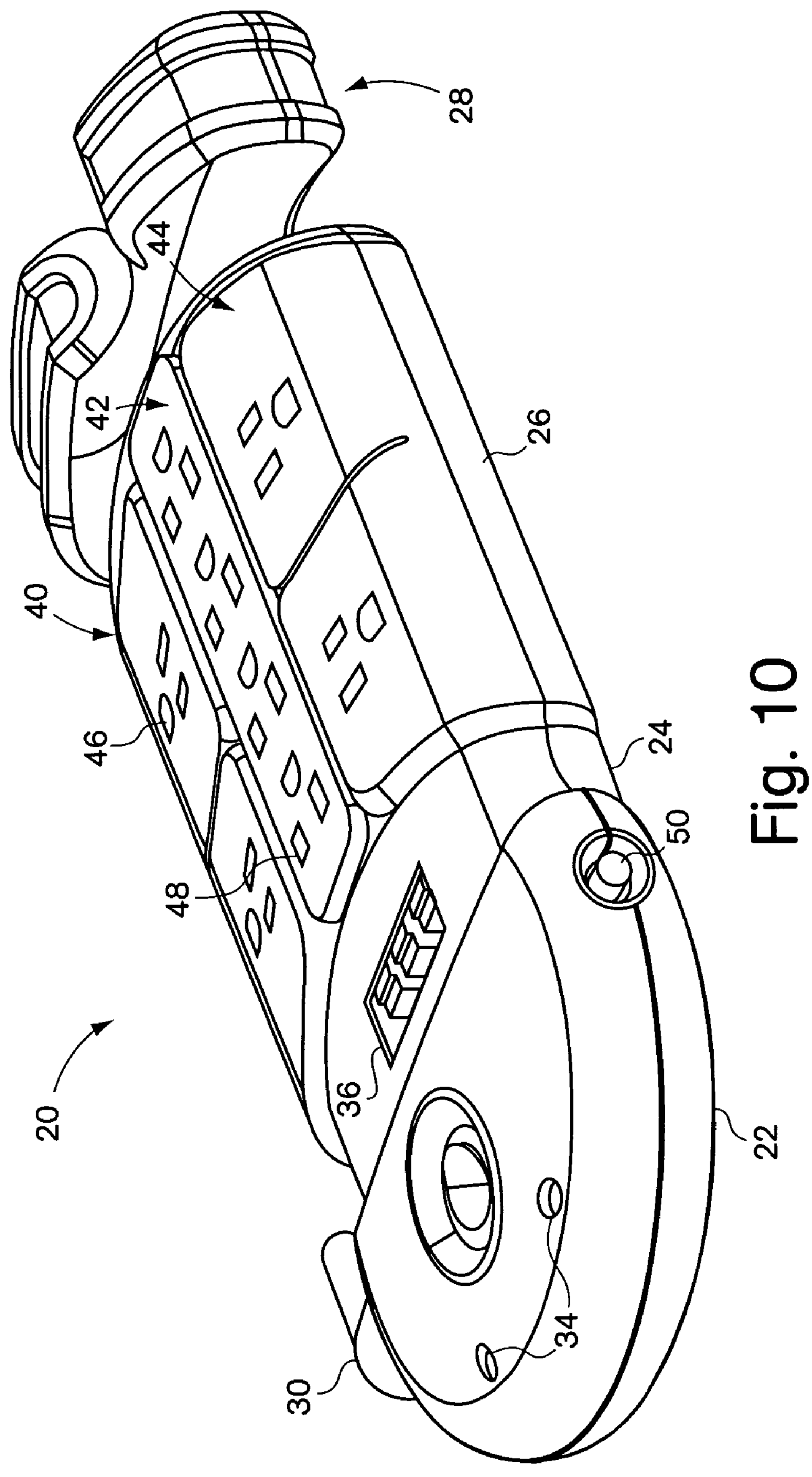
FIG. 10 is a perspective view of another embodiment of a surge suppressor according to the invention.

With reference to FIGS. 3B and 10, an alternative embodiment of a surge suppressor 20 according to the invention has eight total outlets including three center outlets and two peripheral rows of two peripheral outlets each. FIG. 3B also shows a clear view of the surge suppressors MOVs 56. With reference to FIGS. 1, 3B, 5, 8, and 9, the surge suppressor further includes a power cord 30 that can rotate 180 degrees about an axis that is perpendicular to the surface at the point of contact between the power cord 30 and the housing 27. A strain relief 33, coupled to the power cord, seats in a power cord retention element 35 to anchor the power cord 30 to the housing 27. The strain relief includes a rotation-limiting element 37 that comes into contact with a corresponding rotation limiting element on the lower housing portion 50. By limiting the rotation of the power cord, embodiments of a surge suppressor according to the invention facilitate movement of the cord to prevent obstruction of the user interface of the device while concurrently preventing the power cord from being twisted away from the PCB to which it is connected. Thus, FIG. 8 shows the rotating power cord in a first position and FIG. 9 shows the rotating power cord rotated through 180 degrees from the first position to a second position.

Figure 4:
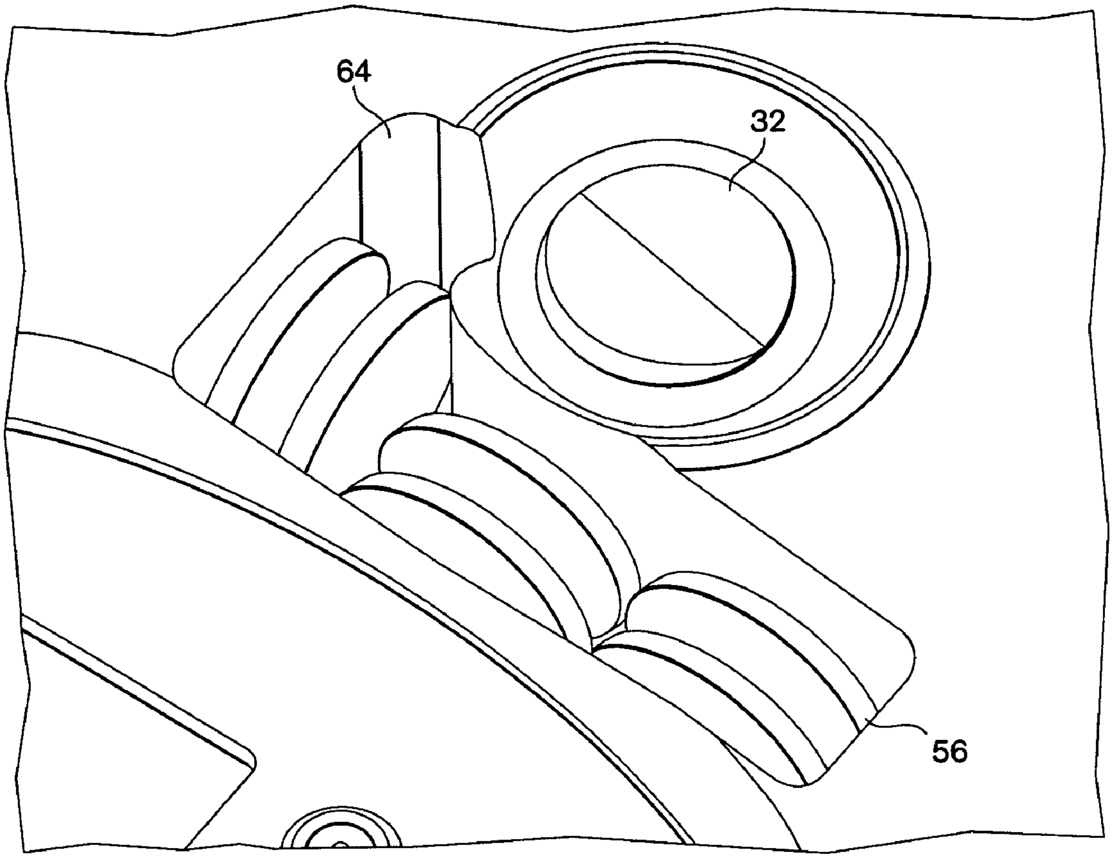
FIG. 4 is a cutaway view of the MOV and thermal fuse isolation structure.
Figure 5:
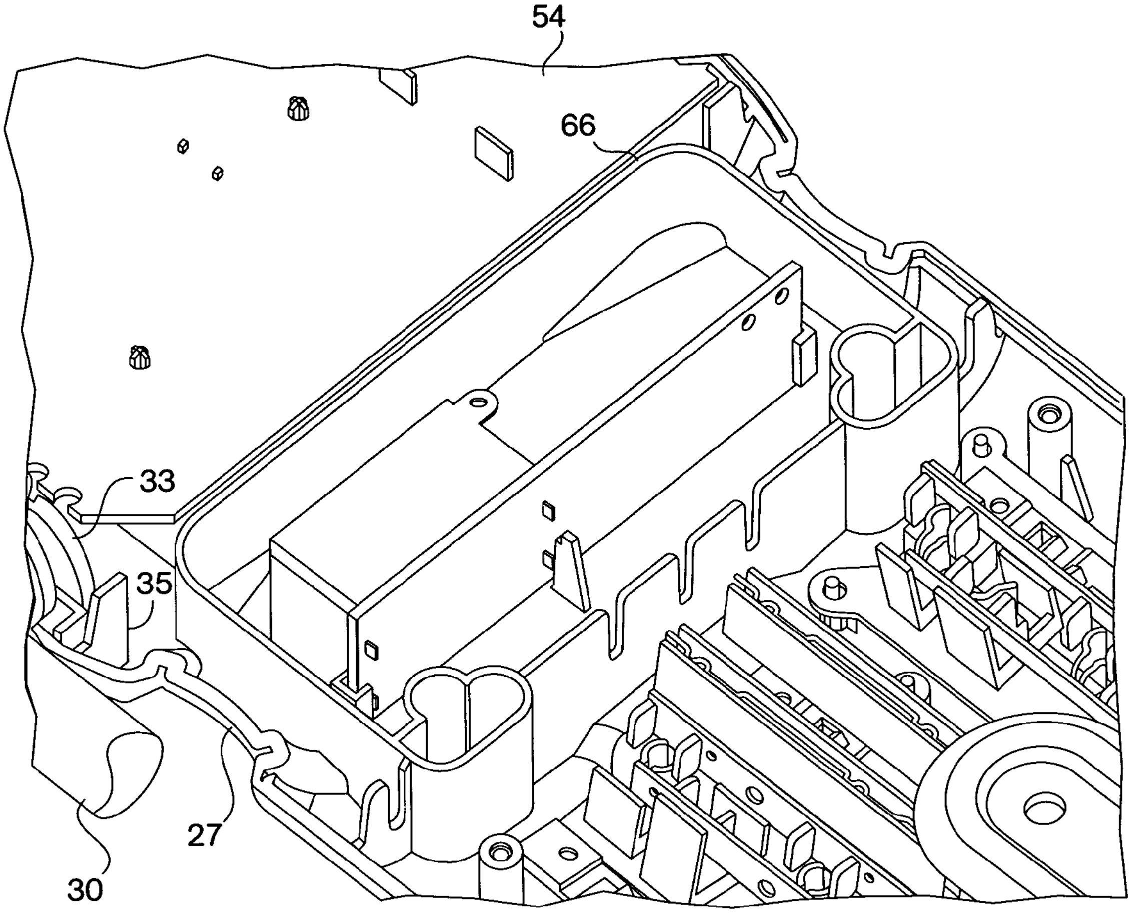
FIG. 5 is a perspective view of one embodiment of the intermediate section, e.g., the data section, of the surge suppressor of FIG. 1.
Figure 6:
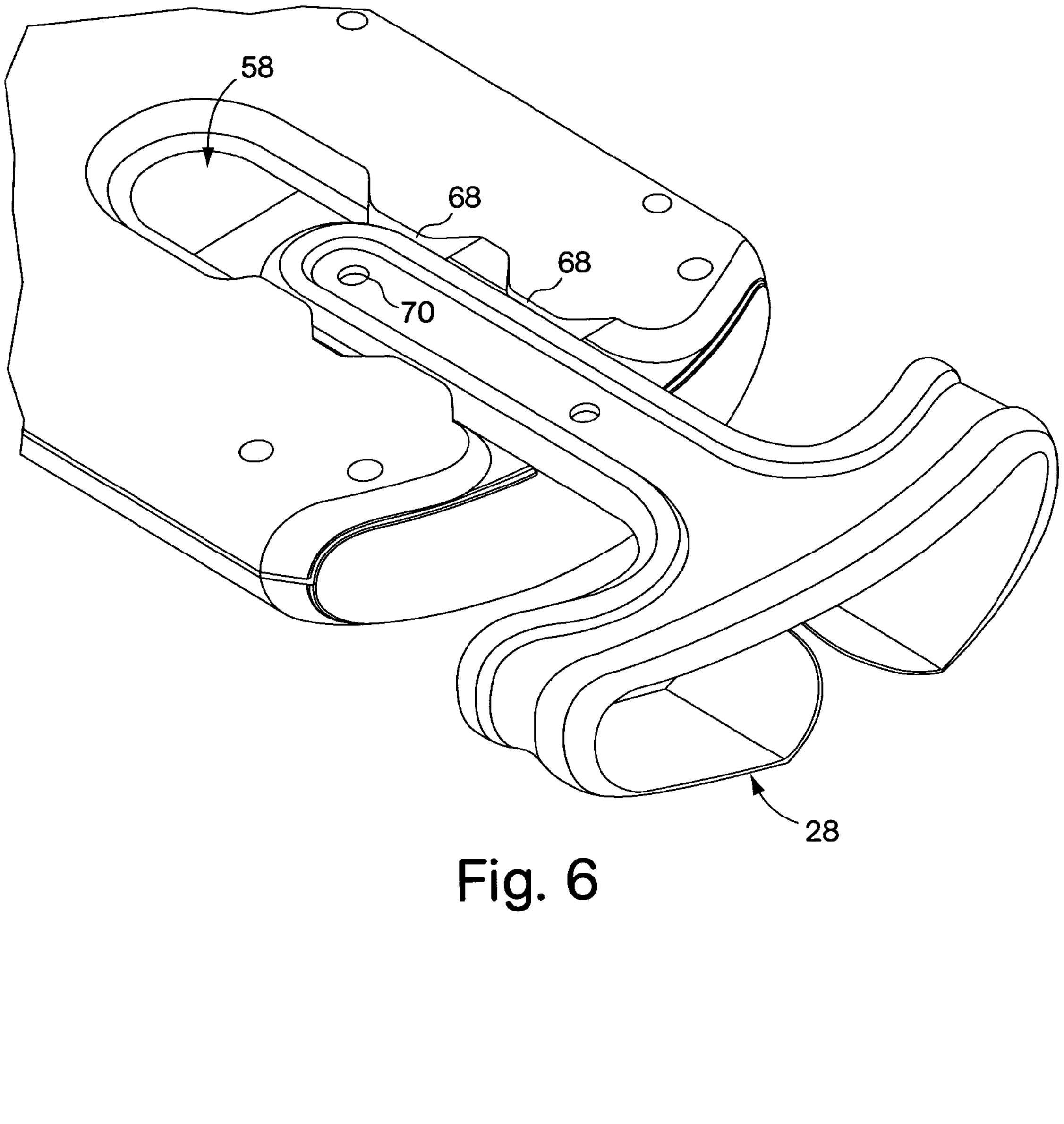
FIG. 6 is a perspective view of the bottom of the surge suppressor of FIG. 1.

With reference to FIGS. 1 and 4, in one embodiment the isolation structure 64 can take the form of an L-shaped enclosure that contains a plurality of MOVs 56 and at least one thermal fuse. The illustrated enclosure is located between the master switch 32 and the intermediate section 24. With reference to FIGS. 1 and 5, as noted above, the surge suppressor can further include an intermediate section defining (ISD) structure 66. As illustrated, the ISD structure 66 can take the form of a wall 66 that substantially provides 360-degree physical isolation of the data elements from the rest of the surge suppressor. In other words, in combination with the first and second portions 50, 52 of the housing, the wall 66 can substantially encapsulate the data elements of the surge suppressor to protect the rest of the surge suppressor from any smoke and/or debris that may occur in the data section due to a catastrophic event.

Figure 11:
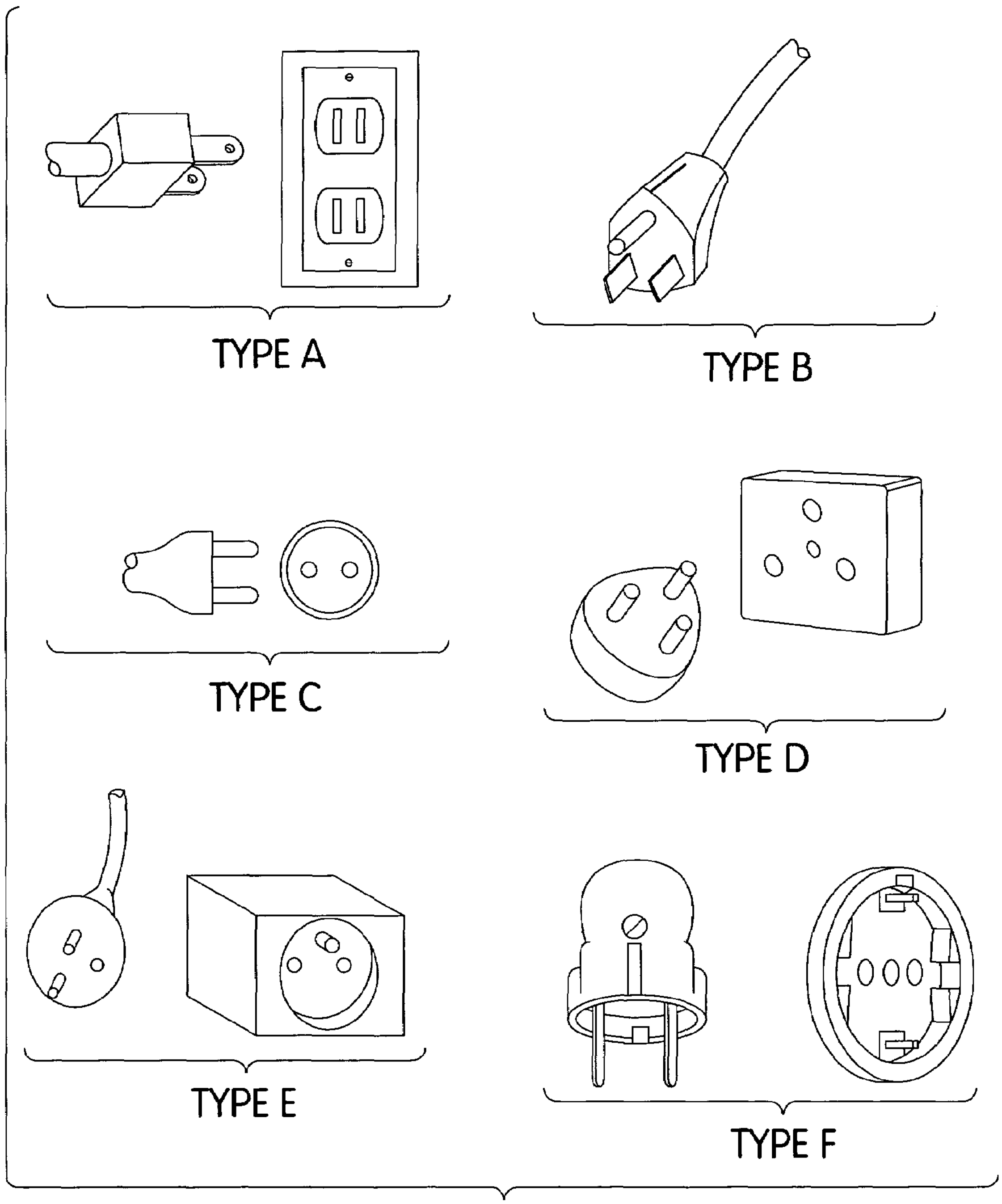
FIGS. 11 and 12 illustrate a variety of plugs and/or outlets for use with the surge suppressor of FIG. 1.
Figure 12:
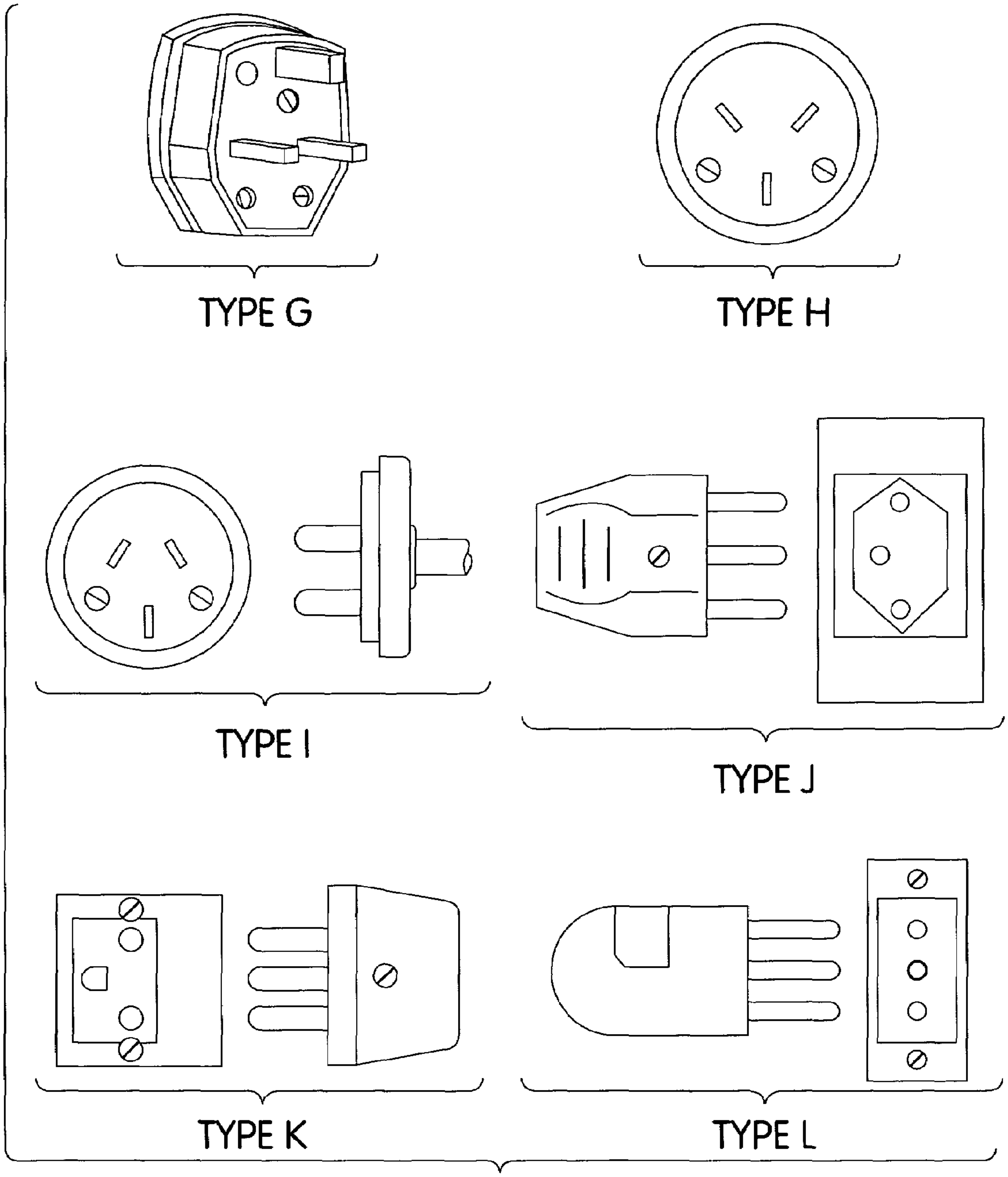

With reference to FIGS. 1, 11 and 12, surge suppressors can include a variety of outlet types including the following: a type A outlet for accommodating a flat blade plug; a type B outlet for accommodating a plug with flat blades and round grounding pins; a type C outlet for accommodating a plug with round pins; a type D outlet for accommodating a plug with round pins and a ground pin in an equilateral triangle shape; a type E outlet for accommodating a plug with round pins and a female grounding receptacle; a Schuko outlet; a type G outlet for accommodating a plug with rectangular blades; a type H outlet for accommodating a plug with oblique flat blades and a ground pin in a Y configuration; a type I outlet for accommodating a plug with oblique flat blades and a ground pin in an arrow configuration; a type J outlet for accommodating a plug with round pins and a ground pin arranged in an isosceles triangle shape; a type K outlet for accommodating a plug with round pins and a non-round ground; and a type L outlet for accommodating a plug with round pins and a round ground in a line. Furthermore, a utility outlet for use with the present invention includes an electrical output and can include shutters that are integral to the utility outlet. The shutters require both blades of a power plug to make contact with equal force to allow contact to the electrical output of the utility outlet.

Having thus described at least one illustrative embodiment of the invention, various alterations, modifications and improvements are contemplated by the invention including the following. The surge suppressor can have more or less than three rows of outlets. For example, a surge suppressor according to the invention could have 2 center rows of outlets or just two peripheral rows and no center rows. To expand on this point, for safety reasons, in Great Britain the cord comes out at a right angle relative to the blades of the plug so that a user can not pull on the cord to remove a plug from an outlet. Thus, for surge suppressors meant for Great Britain a center row having outlets arranged in a top-to-bottom order may not be practical and a surge suppressor with two peripheral rows alone may be more appropriate. Furthermore, the invention contemplates the use of a MOV with an integral thermal fuse in addition to embodiments in which the MOV and the thermal fuse are provided separately. In addition, various modifications to the cord manager as are known in the art are contemplated by the invention. For example, the means for engaging the cord manager with the housing of the surge suppressor could involve a shaft as opposed to a flat spine. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A surge suppressing device comprising:

a housing defining an internal void that includes a power section and an outlet section;

a power circuit located within the power section, the power circuit including a metal oxide varistor and a thermal fuse in proximity to the varistor;

an isolation structure in the form of a wall integral with the housing and extending into the power section to define an internal void for containing the varistor with the thermal fuse, to isolate the varistor with the thermal fuse from the remainder of the internal void defined by the housing so that emissions from the varistor caused by an overvoltage event are contained by the isolation structure; and a plurality of utility outlets located in the outlet section, the outlets being coupled to the power circuit.

2. The device of claim 1 wherein the power circuit is mounted on a printed circuit board.

3. The device of claim 2 wherein the housing includes first and second opposed housing portions and wherein the wall seals against the first housing portion and the power printed circuit board to contain the varistor and thermal fuse.

4. The device of claim 1 wherein the device further comprises an overload detection circuit in electrical communication with the power circuit, the overload detection circuit operative to detect the onset of a power overload situation.

5. The device of claim 1 wherein at least one of the plurality of utility outlets comprises an electrical output and shutters that are integral to the at least one utility outlet, the shutters requiring both blades of a power plug to make contact with equal force to allow contact to the output of the utility outlet.

6. The device of claim 1 wherein the device further comprises a power cord including a power line connected to the power circuit.

7. A surge suppressing device comprising:

a housing having a first face, the first face defining;

a power section, the power section comprising;

a power circuit having a metal oxide varistor and a thermal fuse in proximity to the varistor;

an isolation structure in the form of a wall integral with the housing to define an internal void containing the varistor with the thermal fuse, the isolation structure constructed and arranged to isolate the varistor with the thermal fuse from at least a portion of the surge suppressing device and to contain emissions from the varistor during an overvoltage event;

a data section adjacent to the power section, the data section including data interfaces; and an outlet section adjacent to the data section, the outlet section including a plurality of utility outlets.

8. The device of claim 7 wherein the power circuit is mounted on a printed circuit board.

9. The device of claim 8 wherein the housing comprises:

first and second opposed housing portions and wherein the isolation structure is a wall that is integral with the first housing portion, the wall being adapted to seal against the power printed circuit board to contain the varistor and the thermal fuse.

10. The device of claim 7 wherein the device further comprises an overload detection circuit in electrical communication with the power circuit, the overload detection circuit operative to detect the onset of a power overload situation.

11. The device of claim 7 wherein the device further comprises a power cord including a power line connected to the power circuit.

12. The device of claim 7 wherein the data section separates the power section and the outlet section and is adapted to restrict airflow from the plurality of outlets to the varistor.

13. A surge suppressing device comprising:

a housing;

a power circuit contained in the housing, the power circuit including a metal oxide varistor and a thermal fuse in proximity to the varistor;

isolation means in the form of a wall integral with the housing to define an internal void containing the varistor with the thermal fuse, containing emissions from the varistor during an overvoltage event, and facilitating heat flow between the varistor and the thermal fuse; and a plurality of utility outlets in electrical communication with the power circuit and separated from the varistor and the thermal fuse by the isolation means.

14. A surge suppressing device comprising:

a housing having a first face, the housing defining:

a power section including a power circuit having a metal oxide varistor and a thermal fuse in proximity to the varistor;

an isolation structure in the form of a wall integral with the housing to define an internal void containing the varistor with the thermal fuse, the isolation structure constructed and arranged to isolate the varistor with the thermal fuse from at least a portion of the surge suppressing device and to contain emissions from the varistor during an overvoltage event; and an outlet section including a plurality of utility outlets arranged in two rows on the first face of the housing, wherein the device has a longitudinal axis and the two rows run substantially parallel to the longitudinal axis, the two rows each including at least one center outlet and first and second peripheral outlets arranged in side-to-side order.

* * * * *